United States Patent
Han et al.

(10) Patent No.: US 11,652,240 B1
(45) Date of Patent: May 16, 2023

(54) SOLID-STATE ELECTROCHEMICAL CELLS COMPRISING COATED NEGATIVE ELECTRODES AND METHODS OF FABRICATING THEREOF

(71) Applicant: GRU Energy Lab Inc., San Jose, CA (US)

(72) Inventors: Song Han, Foster City, CA (US); Sa Zhou, San Jose, CA (US)

(73) Assignee: GRU Energy Lab Inc., San Jose, CA (US)

( * ) Notice: Subject to any disclaimer, the term of this patent is extended or adjusted under 35 U.S.C. 154(b) by 221 days.

(21) Appl. No.: 17/111,109

(22) Filed: Dec. 3, 2020

Related U.S. Application Data

(60) Provisional application No. 62/943,154, filed on Dec. 3, 2019.

(51) Int. Cl.
*H01M 10/058* (2010.01)
*H01M 10/052* (2010.01)
(Continued)

(52) U.S. Cl.
CPC .......... *H01M 10/058* (2013.01); *H01G 11/30* (2013.01); *H01G 11/60* (2013.01); *H01G 11/62* (2013.01); *H01M 4/0404* (2013.01); *H01M 4/134* (2013.01); *H01M 4/1395* (2013.01); *H01M 4/386* (2013.01); *H01M 10/052* (2013.01); *H01M 10/0565* (2013.01);
(Continued)

(58) Field of Classification Search
CPC ........ H01G 11/30; H01G 11/60; H01G 11/62; H01M 4/0404; H01M 4/134; H01M 4/1395; H01M 4/386; H01M 10/052; H01M 10/0565; H01M 10/058; H01M 2004/027; H01M 2300/0082; H01M 2300/0085
See application file for complete search history.

(56) References Cited

U.S. PATENT DOCUMENTS

| | | | |
|---|---|---|---|
| 6,432,577 B1* | 8/2002 | Shul | H01M 50/528 429/251 |
| 6,821,675 B1* | 11/2004 | Morigaki | H01M 4/38 429/231.95 |
| 2002/0197536 A1* | 12/2002 | Mori | H01M 10/0565 429/316 |
| 2009/0035642 A1* | 2/2009 | Hatsuda | H01G 11/80 136/252 |
| 2010/0203387 A1* | 8/2010 | Yamamoto | H01M 4/134 429/231.95 |

(Continued)

*Primary Examiner* — Ula C Ruddock
*Assistant Examiner* — Scott J Chmielecki
(74) *Attorney, Agent, or Firm* — Polygon IP, LLP

(57) ABSTRACT

Provided are new solid-state electrochemical cells and methods for fabricating these cells. In some examples, a solid-state electrochemical cell is assembled using a negative electrode, a positive electrode, and a gel-polymer electrolyte layer, which is disposed and provides ionic communications between these electrodes. Prior to this assembly, the negative electrode is free from electrolytes. The negative electrode is fabricated using a coating technique, e.g., forming a slurry, comprising a polymer binder and one or more negative active materials structures, such as silicon, graphite, and the like. The porosity, size, and other characteristics of the negative active materials structures and of the resulting coated later are specifically controlled to ensure operation with the gel-polymer electrolyte layer or, more specifically, high-rate charge and discharge, e.g., greater than 1 mA/cm². The gel-polymer electrolyte layer releases some of its liquid electrolyte after the interface with the negative electrode is formed.

20 Claims, 4 Drawing Sheets

(51) Int. Cl.
*H01M 10/0565* (2010.01)
*H01M 4/04* (2006.01)
*H01M 4/134* (2010.01)
*H01M 4/1395* (2010.01)
*H01G 11/60* (2013.01)
*H01G 11/30* (2013.01)
*H01G 11/62* (2013.01)
*H01M 4/38* (2006.01)
*H01M 4/02* (2006.01)

(52) U.S. Cl.
CPC ............. *H01M 2004/027* (2013.01); *H01M 2300/0082* (2013.01); *H01M 2300/0085* (2013.01)

(56) References Cited

U.S. PATENT DOCUMENTS

| | | | |
|---|---|---|---|
| 2013/0122717 A1* | 5/2013 | Green | C23F 1/16 216/99 |
| 2014/0186717 A1* | 7/2014 | Wang | H01M 10/0525 429/213 |
| 2015/0171396 A1* | 6/2015 | Okuno | H01M 50/431 701/22 |
| 2016/0248115 A1* | 8/2016 | Hatta | H01M 10/0585 |
| 2016/0308243 A1* | 10/2016 | Herle | H01M 4/1391 |
| 2017/0279101 A1* | 9/2017 | Sago | H01M 10/0565 |
| 2018/0277891 A1* | 9/2018 | Mimura | H01M 4/139 |
| 2018/0301762 A1* | 10/2018 | Kwon | H01M 10/0587 |
| 2019/0058177 A1* | 2/2019 | Herle | H01M 50/451 |
| 2019/0088984 A1* | 3/2019 | Takami | H01M 10/44 |
| 2021/0249595 A1* | 8/2021 | Itoh | H01L 45/1666 |
| 2021/0359344 A1* | 11/2021 | Furuya | H01M 4/139 |

\* cited by examiner

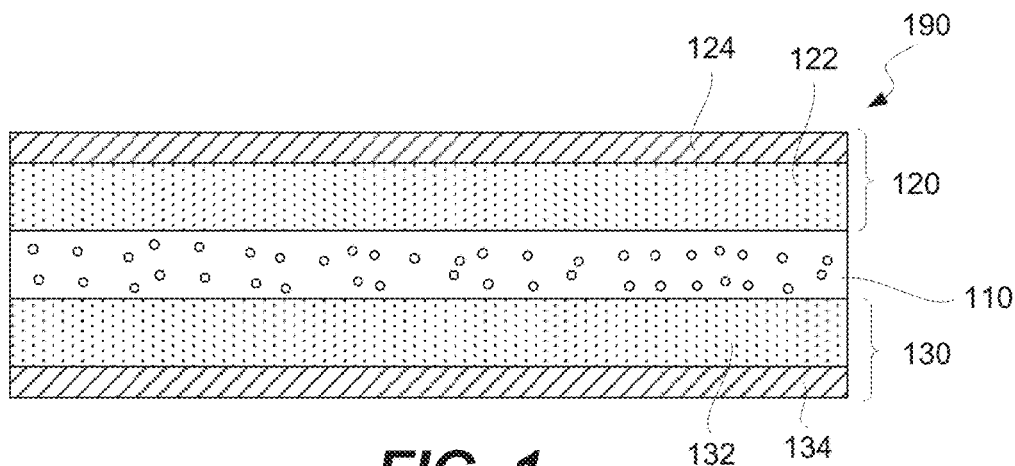
FIG. 1
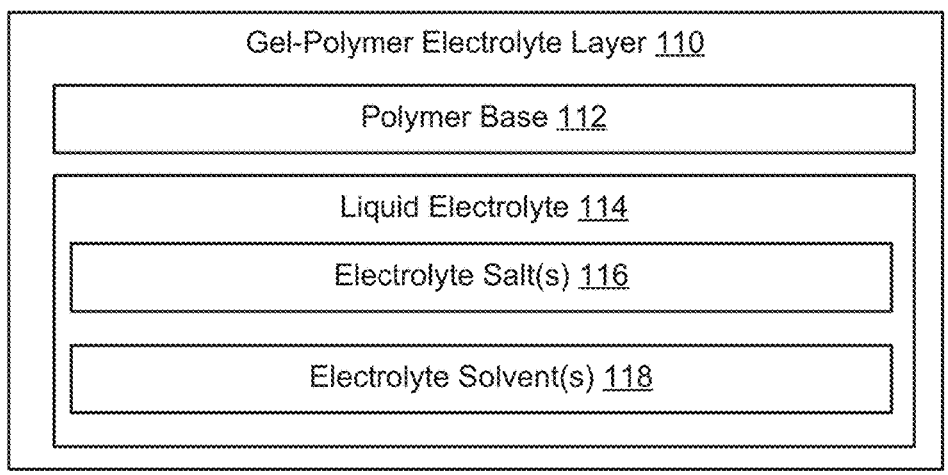
FIG. 2A
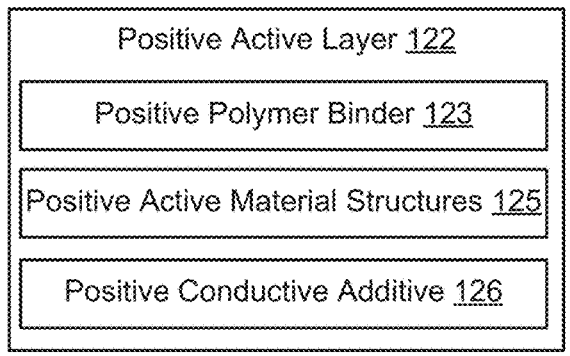 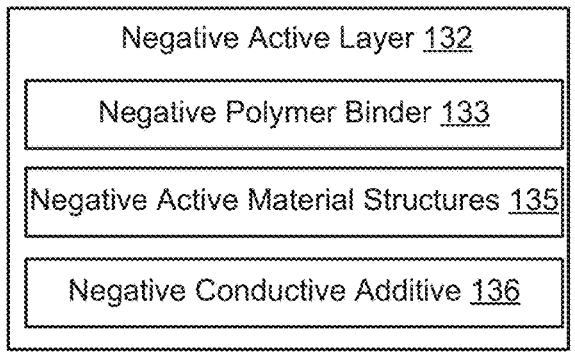
FIG. 2B           FIG. 2C

US 11,652,240 B1

SOLID-STATE ELECTROCHEMICAL CELLS COMPRISING COATED NEGATIVE ELECTRODES AND METHODS OF FABRICATING THEREOF

CROSS-REFERENCE TO RELATED APPLICATIONS

This application claims the benefit under 35 U.S.C. § 119(e) of U.S. Provisional Patent Application No. 62/943,154, filed on Dec. 3, 2019, which is incorporated herein by reference in its entirety for all purposes.

TECHNICAL FIELD

The present disclosure relates generally to fabrication of solid-state electrochemical cells or, more specifically, to fabrication in which negative electrodes formed free from electrolytes, followed by arranging these negative electrodes together with gel-polymer electrolyte layers and positive electrodes into solid-state electrochemical cells.

BACKGROUND

Solid-state electrochemical cells are highly desirable for various applications due to their improved safety and other characteristics. These characteristics are primarily attributed to the controlled electrolyte distribution and the electrolyte containment inside the cells in comparison, for example, to cells with liquid electrolytes. Most lithium-ion solid-state cells use lithium metal to form negative electrodes. However, lithium metal is difficult to process, requires special handling (e.g., glove boxes), and presents various safety concerns (e.g., dendrite growth). Furthermore, electrochemical cells fabricated with lithium metal typically cannot be charged or discharged at high rates, e.g., the charge-discharge currents per unit area are generally limited to less than 1 mA/cm$^2$.

Graphite-based negative electrodes have been proposed for solid-state batteries. However, the adoption has been constrained by various issues associated with incorporating gel-polymer electrolytes into the negative electrodes, during the fabrication of these electrodes. Specifically, graphite and gel polymer electrolyte are mixed into a slurry, which is then coated onto a current collector substrate to form a negative electrode. The electrolyte integration into negative electrodes during the electrode fabrication is essential for these cells. This integration ensures sufficient charge transfer within the electrode volume and provides robust interfaces between the electrodes and electrolyte layers. Finally, high-capacity negative active materials, such as silicon, have not been used in solid-state electrochemical cells due to their low conductivities, large volume expansion, and other like properties. Overall, switching from liquid electrolyte to gel-polymer electrolyte presents significant challenges in charge transfer between negative active material structures and electrode-electrolyte layer interface.

What is needed are new methods for the fabrication of solid-state electrochemical cells, in which negative electrodes are fabricated using coating techniques and are initially free from electrolytes while being capable to support high rate applications after integration into the solid-state electrochemical cells.

SUMMARY

Provided are new solid-state electrochemical cells and methods for fabricating these cells. In some examples, a solid-state electrochemical cell is assembled using a negative electrode, a positive electrode, and a gel-polymer electrolyte layer, which is disposed and provides ionic communications between these electrodes. Prior to this assembly, the negative electrode is free from electrolytes. The negative electrode is fabricated using a coating technique, e.g., forming a slurry, comprising a polymer binder and one or more negative active materials structures, such as silicon, graphite, and the like. The porosity, size, and other characteristics of the negative active materials structures and of the resulting coated later are specifically controlled to ensure operation with the gel-polymer electrolyte layer or, more specifically, high-rate charge and discharge, e.g., greater than 1 mA/cm$^2$. The gel-polymer electrolyte layer releases some of its liquid electrolyte after the interface with the negative electrode is formed.

In some examples, a method of fabricating a solid-state electrochemical cell comprises fabricating a gel-polymer electrolyte layer, comprising a polymer base and a liquid electrolyte, fabricating a positive electrode, and fabricating a negative electrode, using a coating technique. The negative electrode is free from electrolyte materials prior to interfacing with the gel-polymer electrolyte layer. The method also comprises arranging the gel-polymer electrolyte layer, the positive electrode, and the negative electrode such that the gel-polymer electrolyte layer is disposed between and directly interfaces each of the positive electrode and the negative electrode. The gel-polymer electrolyte layer provides ionic conductivity between the positive electrode and the negative electrode.

In some examples, arranging the gel-polymer electrolyte layer, the positive electrode, and the negative electrode comprises transferring a portion of the liquid electrolyte from the gel-polymer electrolyte layer to at least the negative electrode. In more specific examples, arranging the gel-polymer electrolyte layer, the positive electrode, and the negative electrode comprises compressing the gel-polymer electrolyte layer between the positive electrode and the negative electrode. For example, compressing the gel-polymer electrolyte layer between the positive electrode and the negative electrode is performed in situ and is a part of initial cycling of the solid-state electrochemical cell.

In some examples, the solid-state electrochemical cell is operable to charge and discharge at a rate of greater than 1 mA/cm$^2$ based on a surface area of the negative electrode.

In some examples, the negative electrode comprises one or more high-capacity negative active materials, selected from the group consisting of silicon, silicon oxide, silicon alloys, silicide, tin, tin oxide, and germanium. In more specific examples, the negative electrode comprises silicon. In some examples, the negative electrode comprises a conductive additive selected from the group consisting of conductive graphite, graphene, and silicides.

In some examples, the polymer base of the gel-polymer electrolyte layer comprises at least one of polyvinylidene-fluoride-hexafluoropropylene (PVDF-HFP), polyethylene oxide (PEO), polyacrylonitrile (PAN), or polymethyl methacrylate (PMMA). In some examples, the liquid electrolyte comprises one or more electrolyte salts and one or more electrolyte solvents. Some examples of electrolyte solvents include ethylene carbonate (EC), propylene carbonate (PC), butylene carbonate (BC), vinylethylene carbonate (VEC), gamma-butyrolactone (GBL), gamma-valerolactone (GVL), alpha-angelica lactone (AGL), dimethyl carbonate (DMC), methyl ethyl carbonate (MEC), diethyl carbonate (DEC), methyl propyl carbonate (MPC), dipropyl carbonate (DPC), methyl butyl carbonate (NBC), dibutyl carbonate (DBC), tetrahydrofuran (THF), 2-methyltetrahydrofuran, 1,4-dioxane, 1,2-dimethoxyethane (DME), 1,2-diethoxyethane and 1,2-dibutoxyethane, acetonitrile, adiponitrile, methyl propionate, methyl pivalate, butyl pivalate, octyl pivalate, or dimethyl formamide. Some examples of electrolyte solvents include electrolyte salts include $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$).

In some examples, the polymer base traps the liquid electrolyte prior to arranging the gel-polymer electrolyte layer, the positive electrode, and the negative electrode.

In some examples, the negative electrode comprises porous negative active material structures, For example, the porosity of the porous negative active material structures is between 0% and 20%.

In some examples, the negative electrode comprises primary negative active material structures and secondary negative active material structures. The principal dimension of the primary negative active material structures is between 100 nanometers and 500 nanometers. The principal dimension of the secondary negative active material structures is between 5 nanometers and 10 nanometers.

In some examples, fabricating the gel-polymer electrolyte layer comprises forming a polymer solution, coating the polymer solution on at least one side of a support core, thereby forming an interface layer on at least one side of the support core, and submerging the support core with the interface layer into the liquid electrolyte. For example, the polymer solution comprises one or more of polyvinylidene fluoride-co-hexafluoropropylene (PVDF-HFP), polyacrylonitrile (PAN), poly(methyl methacrylate) (PMMA), or polyethylene oxide (PEO). In the same or other examples, the polymer solution comprises one or more fillers selected from the group of titanium dioxide ($TiO_2$), silicon dioxide ($SiO_2$), aluminum oxide ($Al_2O_3$), sulfide compound, garnet oxide, NASICON-type phosphate glass-ceramics (LAGP), oxynitride, and AB3-type hydrogen storage alloy. In some examples, the polymer solution comprises water for controlling the porosity of the interface layer.

BRIEF DESCRIPTION OF THE DRAWINGS

FIG. 1 is a schematic illustration of an assembly comprising a negative electrode, a positive electrode, and a gel-polymer electrolyte layer, which is disposed between these electrodes, in accordance with some examples.

FIG. 2A is a block diagram representing various components of a gel-polymer electrolyte layer, in accordance with some examples.

FIG. 2B is a block diagram representing various components of a positive active layer, prior to interfacing with a gel-polymer electrolyte layer, in accordance with some examples.

FIG. 2C is a block diagram representing various components of a negative active layer, prior to interfacing with a gel-polymer electrolyte layer, in accordance with some examples.

DETAILED DESCRIPTION

Figure 3:
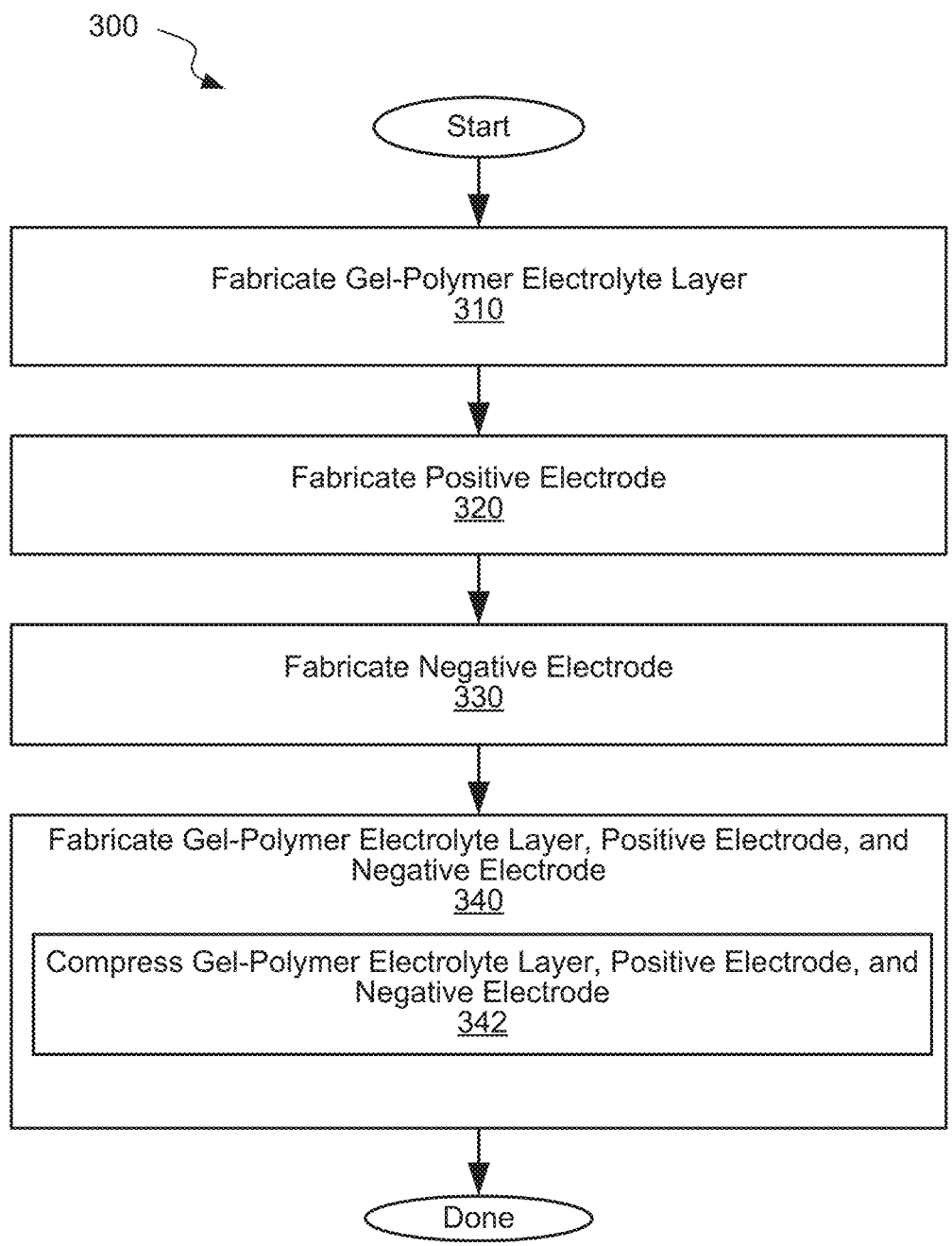
FIG. 3 is a process flowchart corresponding to a method of fabricating a solid-state electrochemical cell, in accordance with some examples.

In the following description, numerous specific details are outlined in order to provide a thorough understanding of the present invention. The present invention may be practiced without some or all of these specific details. In other instances, well-known process operations have not been described in details to avoid obscuring the present invention. While the invention will be described in conjunction with the specific examples, it will be understood that it is not intended to limit the invention to the examples.

Introduction

Provided are new solid-state electrochemical cells and methods for fabricating these cells. Unlike conventional cells, the solid-state electrochemical cells described herein comprise negative electrodes, which are fabricated using coating techniques in which the slurry is free from any electrolyte. As such, negative electrodes do not contain electrolytes after their fabrication and before integration into cells. More specifically, before with gel-polymer electrolyte layers (e.g., during the cell fabrication), these negative electrodes are fee from the electrolyte. The solid-state electrochemical cells, assembled with these negative electrodes, are capable of high rate applications, such as charge and discharge rates of greater than 1 $mA/cm^2$, based on the surface area of the negative electrodes.

These new solid-state electrochemical cells and their fabrication methods allow using high-capacity negative active materials, such silicon (Si), silicon oxides, silicon alloys, silicides, tin (Sn), tin oxides, germanium, and the like, in negative electrodes without sacrificing rate performance of solid-state electrochemical cells. Other negative active materials, such as graphite and lithium-titanium oxide (LTO), as well as various combinations of different negative active materials, used in the same negative electrode, are also within the scope.

Examples of Negative Electrodes and Assemblies Comprising These Negative Electrodes FIG. 1 is a schematic cross-sectional view of assembly 190, comprising positive electrode 120, negative electrode 130, and gel-polymer electrolyte layer 110, disposed between and directly interfacing positive electrode 120 and negative electrode 130. Gel-polymer electrolyte layer 110 provides ionic conductivity between positive electrode 120 and negative electrode 130. At the same time, gel-polymer electrolyte layer 110 physically separates positive electrode 120 and negative electrode 130, preventing electrical shorts between positive electrode 120 and negative electrode 130. Assembly 190 may be a part of a stack or a jellyroll of the solid-state electrochemical cell, as further described below with reference to FIG. 4.

Positive electrode 120 comprises positive current collector 124 and positive active layer 122. Positive current collector 124 provides mechanical support to positive active layer 122 as well as electronic conductivity between positive active layer 122 and, for example, a positive terminal of the solid-state electrochemical cell. Positive active layer 122 directly interfaces and participates in ionic exchange with gel-polymer electrolyte layer 110.

Negative electrode 130 comprises negative current collector 134 and negative active layer 132. Negative current collector 134 provides mechanical support to negative active layer 132 as well as electronic conductivity between negative active layer 132 and, for example, a negative terminal of the solid-state electrochemical cell. Negative active layer 132 directly interfaces and participates in ionic exchange with gel-polymer electrolyte layer 110.

Referring to a block diagram in FIG. 2A, in some examples, gel-polymer electrolyte layer 110 comprises polymer base 112 and liquid electrolyte 114. During fabrication of the electrochemical cell, liquid electrolyte 114 is initially trapped within and supported by polymer base 112. This electrolyte trapping feature allows handling gel-polymer electrolyte layer 110 in various environments, which would otherwise not be suitable for standalone liquid electrolytes (e.g., dry rooms vs. glove boxes). In some examples, liquid electrolyte 114 represents less than 10% by weight of the entire electrochemical cell including all cell components, such as casing, e.g., about 5% by weight. As a reference, the amount of liquid electrolytes used in electrochemical cells, which are not solid states and which use liquid electrolytes without polymer bases, is about 25% by weight. This type of electrochemical cells may be referred to as liquid-based electrochemical cells. As such, the initial trap of liquid electrolyte 114 in polymer base 112 in solid-state electrochemical cells allows using smaller amounts of liquid electrolyte 114 thereby increasing the volumetric and gravimetric capacity of the solid-state electrochemical cells in comparison to liquid-based electrochemical cells. Furthermore, polymer base 112 eliminates the need for a separator, as a component of electrochemical cells.

In some examples, polymer base 112 comprises at least one of polyvinylidenefluoride-hexafluoropropylene (PVDF-HFP), polyethylene oxide (PEO), polyacrylonitrile (PAN), or polymethyl methacrylate (PMMA). In some examples, polymer base 112 comprises a support core and one or two interface layers on the surface of the support core. The interface layers are used to conform to electrode surfaces (e.g., with high surface roughness), while the support core prevents any physical penetration and electrical shorts through the gel-polymer electrolyte by the electrodes. Specifically, the interface layer redistributes around protruding peaks of the electrode surface and forms a continuous interface with the electrode surface. When the stack is compressed, the gel-polymer electrolyte also releases a portion of its liquid electrolyte, which soaks the electrode and enhances ionic transfer within the electrode and through the interface with the electrode. The gel-polymer electrolyte is formed by coating interface layers on the support core and soaking this assembly in a liquid electrolyte.

Liquid electrolyte 114 comprises one or more electrolyte salts 116 and one or more solvents 118. Some examples of suitable solvents include, but are not limited to, cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane) nitriles (e.g., acetonitrile and adiponitrile) linear esters (e.g., methyl propionate, methyl pivalate, butyl pivalate and octyl pivalate), and amides (e.g., dimethyl formamide). Some examples of salts include $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li)$, and combination of thereof. The total concentration of one or more salts in the electrolyte is at least about 0.3 M or, more specifically, at least about 0.7M.

As described above, polymer base 112 is configured to initially trap liquid electrolyte 114. However, liquid electrolyte 114 is later released from polymer base 112. Once liquid electrolyte 114 is released, liquid electrolyte 114 flows and soaks positive electrode 120 and negative electrode 130. This electrode soaking enhances ionic transfer within each of electrode 120 and negative electrode 130 at the interface between positive electrode 120 and gel-polymer electrolyte layer 110 as well as the interface between negative electrode 130 and gel-polymer electrolyte layer 110.

Referring to FIG. 2B, positive active layer 122 comprises positive polymer binder 123, positive active material structures 125, and positive conductive additive 126. Some materials of positive active material structures 125 include, but are not limited to, Li $(M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2)$, $Li(Co_xM_{1-x})O_2$, where M is a metal, (e.g., $Li(Co_xNi_{1-x})O_2$ and $Li(Co_xFe_{1-x})O_2)$, $Li_{1-W}(Mn_xNi_yCo_z)O_2$, (e.g., $Li(Co_xMn_YNi_{(1-X-Y)})O_2$, $Li(Mn_{1/3}Ni_{1/3}Co_{1/3})O_2$, $Li(Mn_{1/3}Ni_{1/3}Co_{1/3-x}Mg_x)O2$, $Li(Mn_{0.4}Ni_{0.4}Co_{0.2})O_2$, $Li(Mn_{0.1}Ni_{0.1}Co_{0.8})O_2$,) $Li_{1-W}(Mn_xNi_xCo_{1-2x})O_2$, $Li_{1-W}(Mn_xNi_yCoAl_W)O_2$, $Li_{1-W}(Ni_xCo_YAl_Z)O_2$ (e.g., $Li(Ni_{0.8}Co_{0.15}Al_{0.05})O_2)$, $Li_{1-W}(Ni_xCo_YM_Z)O_2$, where M is a metal, $Li_{1-W}(Ni_xMn_yM_z)O_2$, where M is a metal, $Li(Ni_{X-Y}Mn_YCr_{2-x})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g., $LiV_3O_8$, $LiV_2O_5$, and $LiV_6O_{13}$.

Referring to FIG. 2C, negative active layer 132 comprises negative polymer binder 133, negative active material structures 135, and negative conductive additive 136. Various features of negative active layer 132 are specifically selected to achieve the robust electrical and ionic connection between negative active layer 132 and gel-polymer electrolyte layer 110. For example, negative active layer 132 comprises negative conductive additive 136, which may be in the form of one-dimensional and two-dimensional structures. For purposes of this disclosure, a one-dimensional structure has a ratio of one principal dimension to each of the remaining two dimensions greater than 10. Some examples include, but are not limited to, nanotubes, nanowires, and fibers or, more specifically, carbon nanotubes, carbon nanowires, vapor-grown carbon fiber. A two-dimensional structure has a ratio of each of two principal dimensions to the remaining dimension greater than 10. Some examples include, but are not limited to, flakes and sheets or, more specifically, thin conductive graphite and graphene. Without being restricted to any particular theory, it is believed that negative conductive additive 136 in the form of one-dimensional and two-dimensional structures provide a better in situ conductivity within negative active layer 132 and a better interface conductivity with gel-polymer electrolyte layer 110 in comparison, for example, to particles, which are three-dimensional structures. A ratio of any two principal dimensions in a three-dimensional structure is less than 10.

Besides carbon, negative conductive additive 136 may comprise metal silicides (e.g., titanium silicides), silicon, tin, tin oxide, germanium, silicon-carbon composites, silicon oxides, silicon oxide-carbon composites, and various combinations thereof.

In some examples, the amount of negative conductive additive 136 negative active layer 132 is between 0% by weight and 10% by weight, between 10% by weight and 30% by weight or between 30% by weight and 50% by weight based on the total solid weight of the negative active material layer. While the higher amount improves the electronic conductivity of negative active layer 132, negative conductive additive 136 is not electrochemically active and does not participate in charge storage, therefore negatively impacting the capacity of the cell.

In some examples, negative active material structures 135 are doped. Some examples of dopants include sulfur, boron, arsenic, and other like materials. The concentration of dopants in negative active material structures 135 may be between $10^{15}$ cm$^{-3}$ and $10^{22}$ cm$^{-3}$. The dopant not only improves the electronic conductivity of negative active layer 132 but also the electronic conductivity within each of negative active material structures 135, which in turn helps to drive ionic conductivity within negative active material structures 135 during charging and discharging of the cell.

In some examples, negative active material structures 135 comprise conductive shells. For example, one of negative active material structures 135 may include a core and shell, having a different composition, morphology, or other characteristics from the core.

In some examples, the morphology or, more specifically, the porosity of negative active material structures 135 and/or of negative active layer 132 is controlled to ensure ionic exchange with gel-polymer electrolyte layer 110. For example, negative active material structures 135 that comprise silicon will experience large volume changes, i.e., expansion while receiving lithium ions and contraction while releasing lithium ions. The porosity of negative active material structures 135 and/or of negative active layer 132 is specifically selected to overcome this issue. In some examples, the porosity of negative active material structures 135 is between 0% and 20%, between 20% and 40%, between 40% and 60%, or between 60% and 90%. Furthermore, the porosity of negative active layer 132 may be between 15% and 40%, between 40% and 70%, or between 70% and 90%.

In some examples, the principal dimension of negative active material structures 135 is between 0 nanometers and 100 nanometers, between 100 nanometers and 500 nanometers, between 500 nanometers and 1 micrometer, between 1 micrometer and 10 micrometers. As noted above, negative active material structures 135 may be one-dimensional structures or two-dimensional structures. The size of negative active material structures 135 also determines the surface roughness of negative active layer 132, which interfaces gel-polymer electrolyte layer 110. The smoother surface of negative active layer 132 provides better mechanical and ionic contact and more uniform interface and less conformality from gel-polymer electrolyte layer 110. Furthermore, less liquid electrolyte 114 is needed to fill voids between negative active layer 132 and polymer base 112 then these two components are positioned against each other.

In some examples, negative active layer 132 comprises two or more sets of negative active material structures 135, which have different size, shape, porosity, composition, or other differentiating property. For example, negative active material structures 135 in a second set may have a larger principal dimension than negative active material structures 135 in a first set. Negative active material structures 135 in the first set may be referred to as primary negative active material structures 135, while the negative active material structures 135 in the second set may be referred to as secondary negative active material structures 135 and, in some examples, may be aggregate structures of the first negative active material. For example, the principal dimension of the primary negative active material structures 135 is between 0 nanometers and 20 nanometers, while the principal dimension of the secondary negative active material structures 135 is between 50 nanometers and 200 nanometers. In another example, the principal dimension of the primary negative active material structures 135 is between 100 nanometers and 500 nanometers, while the principal dimension of the secondary negative active material structures 135 is between 5 nanometers and 10 nanometers.

Fabricating Electrochemical Cell Examples STOP HERE

FIG. 3 is a process flowchart corresponding to method 300 of fabricating a solid-state electrochemical cell, in accordance with some examples. Method 300 comprises fabricating gel-polymer electrolyte layer 110 (block 310). For example, one or more polymer materials are dissolved in one or more solvents, thereby forming a polymer solution. The polymer solution is used for coating one or both interface layers over a support core. Some examples of more polymer materials include polyvinylidene fluoride-co-hexafluoropropylene (PVDF-HFP), polyacrylonitrile (PAN), poly(methyl methacrylate) (PMMA) and/or polyethylene oxide (PEO). Some examples of solvents include n-methyl-2-pyrrolidone (NMP), acetone, and tetrahydrofuran (THF). For example, PVDF-HFP may be dissolved in a combination of NMP and acetone. In some examples, water or another porosity-forming agent is added to the polymer solution to control the porosity of the interface layers. For example, water bubbles evaporate during the drying process, leaving pores insides the solidifying polymer.

In some examples, the electrolyte layer fabrication operation comprises adding one or more fillers to the polymer solution. Some examples of fillers are inorganic materials, such as titanium dioxide ($TiO_2$) particles, silicon dioxide ($SiO_2$), aluminum oxide ($Al_2O_3$), sulfide compounds (e.g., argyrodite, LGPS, LPS, etc.), garnet structure oxides (e.g., LLZO with various dopants), NASICON-type phosphate glass ceramics (LAGP), oxynitrides (e.g., lithium phosphorus oxynitride or UPON), and AB3-type hydrogen storage alloy. The fillers improve mechanical stability of the resulting structures. Furthermore, the adsorbed electrolyte is harder to be pushed out with these fillers.

In some examples, the electrolyte layer fabrication operation comprises coating the polymer solution onto a support core. For example, the roll-to-roll coating may be used for this operation. The thickness of the applied polymer solution is controlled by a doctor roll or a doctor blade. The applied polymer solution is then subjected to heating to evaporate solvents and form the interface layer, formed over the support core.

In some examples, the electrolyte layer fabrication operation comprises introducing a liquid electrolyte into the support core and one or two interface layers. For example, an assembly comprising the support core and one or two interface layers is submerged into a liquid electrolyte. In some examples, a vacuum is applied over the surface of the liquid electrolyte to degas pores in the interface layer support core assembly and introduce the liquid electrolyte into the pores. Various examples of liquid electrolytes are described above.

Method 300 comprises fabricating positive electrode 120 (block 320). This operation involves forming a slurry comprising positive active material structures 125, positive polymer binder 123, and positive conductive additives 126. The slurry is coated onto positive current collector 124 and dried thereby forming positive active layer 122.

Method 300 comprises fabricating negative electrode 130 (block 330). This operation involves forming a slurry comprising negative active material structures 135, negative polymer binder 133, and negative conductive additives 136. The slurry is coated onto negative current collector 134 and dried thereby forming negative active layer 132.

Method 300 comprises arranging gel-polymer electrolyte layer 110, positive electrode 120, and negative electrode 130 (block 340). For example, these components may be arranged into a jellyroll or a stack as further described below with reference to FIG. 4.

In some examples, the operation corresponding to block 340 comprises compressing assembly comprising positive electrode 120, gel-polymer electrolyte layer 110, and negative electrode 130 (block 342). This compression operation causes at least some of the liquid electrolyte to be released from gel-polymer electrolyte layer 110 and introduced to positive electrode 120 and negative electrode 130. For example, some liquid electrolyte remains at the interfaces of gel-polymer electrolyte layer 110 within positive electrode 120 and separately with negative electrode 130 to ensure ionic conductivity at these interfaces. Furthermore, some liquid electrolyte is soaked by positive electrode 120 and negative electrode 130, e.g., by penetration into pores of positive electrode 120 and negative electrode 130. This portion of the liquid electrolyte assists with ionic transfer within each positive electrode 120 and negative electrode 130. As such, positive electrode 120 and negative electrode 130 may be initially manufactured without any electrolyte. The electrolyte is supplied during this compression operation.

In some examples, this compression operation is performed before positive electrode 120, gel-polymer electrolyte layer 110, and negative electrode 130 are inserted into battery cases. For example, the stack of positive electrode 120, gel-polymer electrolyte layer 110, and negative electrode 130 may be laminated using a laminator or a roll press. Alternatively, this compression operation is performed in an assembled cell, e.g., in situ. For example, the thickness of positive electrode 120 and/or negative electrode 130 increases during initial cycling developing pressure inside the cell and compressing gel-polymer electrolyte layer 110 while gel-polymer electrolyte layer 110 is positioned between positive electrode 120 and negative electrode 130.

Examples Electrochemical Cells and Applications

Figure 4:
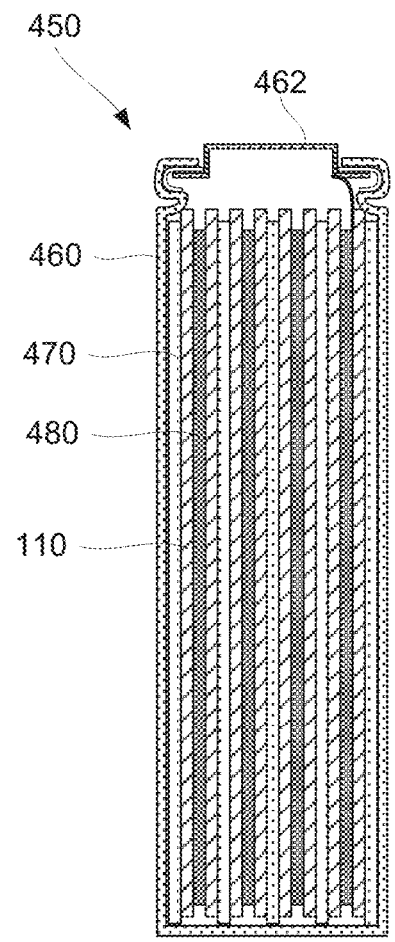
FIG. 4 is a schematic illustration of an electrochemical cell, comprising two electrodes, in accordance with some examples.

FIG. 4 is a schematic illustration of electrochemical cell 450, comprising first electrode 470, second electrode 480, and gel-polymer electrolyte layer 110 arranged in a stack, wound jelly-roll, or any form. Gel-polymer electrolyte layer 110 is disposed between first electrode 470 and second electrode 480 to prevent direct contact between first electrode 470 and second electrode 480 yet allows ionic communication between these electrodes. Specifically, gel-polymer electrolyte layer 110 may include pores filled liquid electrolyte, which allows ions to pass. First electrode 470 and second electrode 480 are also soaked within the liquid electrolyte introduced by gel-polymer electrolyte layer 110.

First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462.

Some examples of electrochemical cell 450 include, but are not limited to, lithium-ion batteries, lithium polymer batteries, lithium-air batteries, lithium sulfite batteries, lithium metal batteries, solid-state batteries, supercapacitors, and the like.

Experimental Examples

Figure 5:
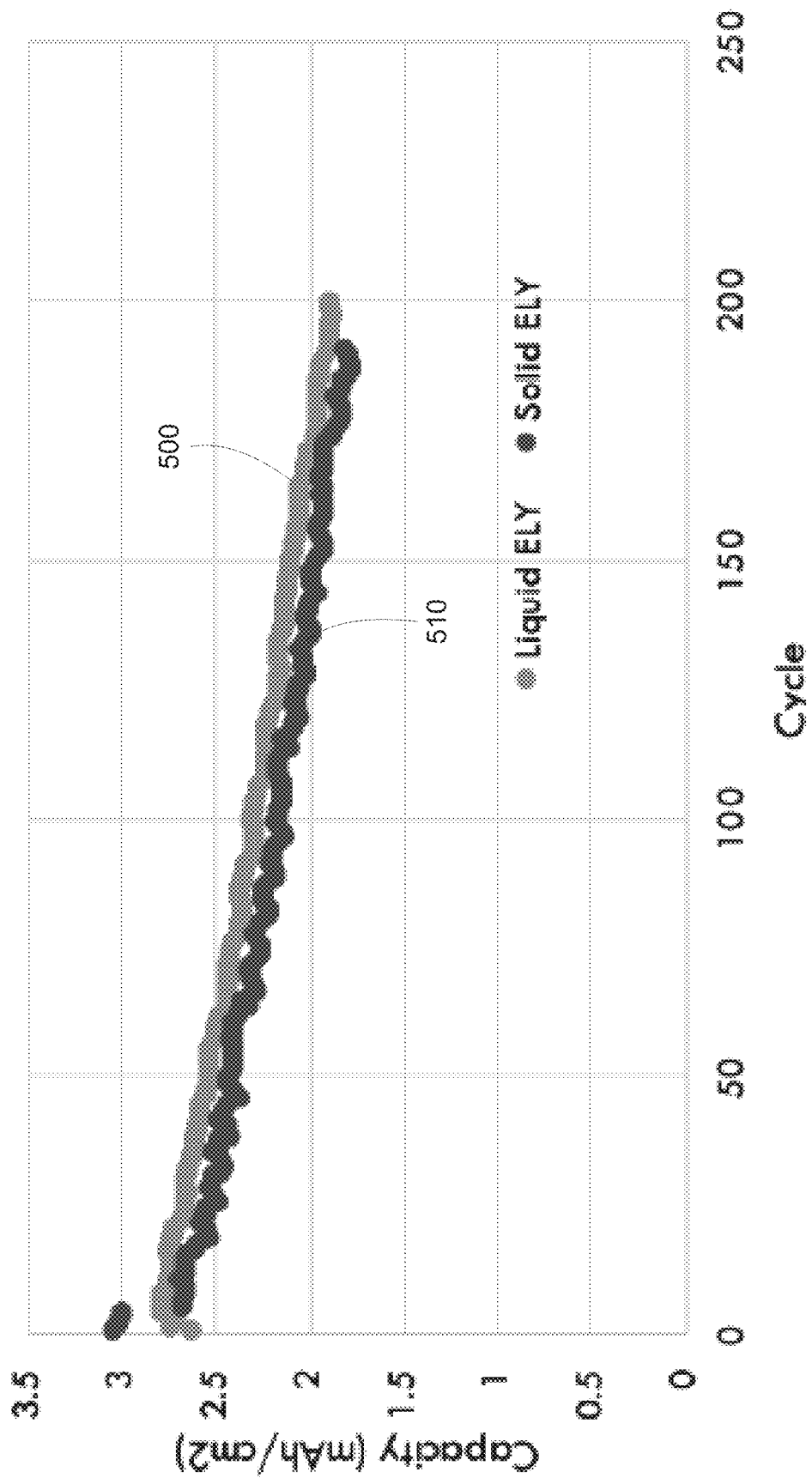
FIG. 5 shows cycling data of a test cell and a reference cell.

FIG. 5 illustrates cycling data for two cells. Specifically, line 500 corresponds to a reference cell, fabricated with a liquid electrolyte. Line 510 corresponds to a test cell, fabricated with a gel-polymer electrolyte layer. Both cells were fabricated with negative active materials structures comprising silicon. The performance of both cells was similar and substantially more superior to conventional solid-state batteries, both in terms of rate and capacity. For example, the area current was 1.58 mA/cm$^2$ (>0.5 C) for the test cell, fabricated with a gel-polymer electrolyte layer, which greatly exceeded the limit of solid-stage cells fabricated with lithium metal. It should be noted that area currents in excess of 1 mA/cm$^2$ are generally not possible with lithium metal due to the risk of dendrite growth. The area capacity at this current level was 2.65 mAh/cm$^2$.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. A method of fabricating a solid-state electrochemical cell, the method comprising:
   fabricating a gel-polymer electrolyte layer, comprising a polymer base and a liquid electrolyte such that the liquid electrolyte is trapped within and supported by the polymer base, wherein fabricating the gel-polymer electrolyte layer comprises:
   forming a polymer solution;
   coating the polymer solution on at least one side of a support core and heating the polymer solution on at least one side of the support core thereby evaporating solvents and forming an interface layer comprising pores on at least one side of the support core; and
   submerging the support core with the interface layer into the liquid electrolyte while applying a vacuum over the surface of the liquid electrolyte thereby driving the liquid electrolyte into the pores of the interface layer;
   fabricating a positive electrode;
   fabricating a negative electrode, using a coating technique, where the negative electrode is free from electrolyte materials prior to interfacing with the gel-polymer electrolyte layer; and arranging the gel-polymer electrolyte layer, the positive electrode, and the negative electrode such that the gel-polymer electrolyte layer is disposed between and directly interfaces each of the positive electrode and the negative electrode and such that a portion of the liquid electrolyte is displaced from the pores of the interface layer and is transferred to at least the negative electrode, and wherein the gel-polymer electrolyte layer provides ionic conductivity between the positive electrode and the negative electrode.

2. The method of claim 1, wherein arranging the gel-polymer electrolyte layer, the positive electrode, and the negative electrode comprises compressing the gel-polymer electrolyte layer between the positive electrode and the negative electrode.

3. The method of claim 2, wherein compressing the gel-polymer electrolyte layer between the positive electrode and the negative electrode is performed in situ and is a part of initial cycling of the solid-state electrochemical cell.

4. The method of claim 1, wherein the solid-state electrochemical cell is operable to charge and discharge at a rate of greater than 1 mA/cm$^2$ based on a surface area of the negative electrode.

5. The method of claim 1, wherein the negative electrode comprises one or more high-capacity negative active materials, selected from the group consisting of silicon, silicon oxide, silicon alloys, silicide, tin, tin oxide, and germanium.

6. The method of claim 1, wherein the negative electrode comprises silicon.

7. The method of claim 1, wherein the negative electrode comprises a conductive additive selected from the group consisting of conductive graphite, graphene, and silicides.

8. The method of claim 1, wherein the polymer base of the gel-polymer electrolyte layer comprises at least one of polyvinylidenefluoride-hexafluoropropylene (PVDF-HFP), polyethylene oxide (PEO), polyacrylonitrile (PAN), or polymethyl methacrylate (PMMA).

9. The method of claim 1, wherein the liquid electrolyte comprises one or more electrolyte salts and one or more electrolyte solvents.

10. The method of claim 9, wherein the one or more electrolyte solvents comprise at least one of ethylene carbonate (EC), propylene carbonate (PC), butylene carbonate (BC), vinylethylene carbonate (VEC), gamma-butyrolactone (GBL), gamma-valerolactone (GVL), alpha-angelica lactone (AGL), dimethyl carbonate (DMC), methyl ethyl carbonate (MEC), diethyl carbonate (DEC), methyl propyl carbonate (MPC), dipropyl carbonate (DPC), methyl butyl carbonate (NBC), dibutyl carbonate (DBC), tetrahydrofuran (THF), 2-methyltetrahydrofuran, 1,4-dioxane, 1,2-dimethoxyethane (DME), 1,2-diethoxyethane and 1,2-dibutoxyethane, acetonitrile, adiponitrile, methyl propionate, methyl pivalate, butyl pivalate, octyl pivalate, or dimethyl formamide.

11. The method of claim 9, wherein the one or more electrolyte salts comprise at least one of $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$).

12. The method of claim 1, wherein the polymer base traps the liquid electrolyte prior to arranging the gel-polymer electrolyte layer, the positive electrode, and the negative electrode.

13. The method of claim 1, wherein the negative electrode comprises porous negative active material structures.

14. The method of claim 13, wherein porosity of the porous negative active material structures is between 0% and 20%.

15. The method of claim 1, wherein the negative electrode comprises primary negative active material structures and secondary negative active material structures, wherein a principal dimension of the primary negative active material structures is between 100 nanometers and 500 nanometers, and wherein a principal dimension of the secondary negative active material structures is between 5 nanometers and 10 nanometers.

16. The method of claim 1, wherein the polymer solution comprises one or more of polyvinylidene fluoride-co-hexafluoropropylene (PVDF-HFP), polyacrylonitrile (PAN), poly(methyl methacrylate) (PMMA), or polyethylene oxide (PEO).

17. The method of claim 1, wherein the polymer solution comprises one or more fillers selected from the group of titanium dioxide ($TiO_2$), silicon dioxide ($SiO_2$), aluminum oxide ($Al_2O_3$), sulfide compound, garnet oxide, NASICON-type phosphate glass-ceramics (LAGP), oxynitride, and AB3-type hydrogen storage alloy.

18. The method of claim 1, wherein the polymer solution comprises water for controlling porosity of the interface layer.

19. The method of claim 2, wherein compressing the gel-polymer electrolyte layer comprises laminating a stack of the positive electrode, the gel-polymer electrolyte layer, and the negative electrode.

20. The method of claim 2, wherein compressing the gel-polymer electrolyte layer is performed prior to inserting the stack into a battery case.

* * * * *